United States Patent [19]
Senda et al.

[11] Patent Number: 5,105,288
[45] Date of Patent: Apr. 14, 1992

[54] LIQUID CRYSTAL DISPLAY APPARATUS WITH THE APPLICATION OF BLACK LEVEL SIGNAL FOR SUPPRESSING LIGHT LEAKAGE

[75] Inventors: Koji Senda, Nagaokakyo; Fumiaki Emoto, Hirakata; Eiji Fujii; Atsuya Yamamoto, both of Takatsuki; Akira Nakamura, Suita, all of Japan

[73] Assignee: Matsushita Electronics Corporation, Osaka, Japan

[21] Appl. No.: 598,493

[22] Filed: Oct. 16, 1990

[30] Foreign Application Priority Data

Oct. 18, 1989 [JP] Japan .................................. 1-270953
Aug. 17, 1990 [JP] Japan .................................. 2-217362

[51] Int. Cl.$^5$ ........................ G02F 1/133; G09G 3/36
[52] U.S. Cl. ........................................ 359/57; 359/85; 340/784
[58] Field of Search ............... 350/332, 333; 340/784, 340/805; 358/236, 237, 241

[56] References Cited

U.S. PATENT DOCUMENTS

| | | | |
|---|---|---|---|
| 4,319,237 | 3/1982 | Matsuo et al. | 340/784 |
| 4,511,926 | 4/1985 | Crossland et al. | 340/784 |
| 4,591,848 | 5/1986 | Mozezumi et al. | 340/805 |
| 4,604,617 | 8/1986 | Morozumi | 340/805 |
| 4,662,718 | 5/1987 | Masubuchi | 350/333 |
| 4,803,480 | 2/1989 | Soneda et al. | 340/784 |
| 4,823,126 | 4/1989 | Nagata et al. | 340/719 |
| 4,922,240 | 5/1990 | Duwaer | 340/784 |
| 5,017,914 | 5/1991 | Uchida et al. | 340/784 |
| 5,040,874 | 8/1991 | Fukuda | 359/54 |

Primary Examiner—Stanley D. Miller
Assistant Examiner—Tai V. Duong
Attorney, Agent, or Firm—Panitch, Schwarze, Jacobs & Nadel

[57] ABSTRACT

A liquid crystal display apparatus in which leakage of light caused by signal lines can be eliminated is disclosed. In the liquid crystal display apparatus, a predetermined potential corresponding to the black level is applied to the video signal lines during a period of time other than the horizontal blanking period, and image signals are transferred to one row of the pixels through the signal lines which the horizontal blanking period.

5 Claims, 5 Drawing Sheets

LIQUID CRYSTAL DISPLAY APPARATUS WITH THE APPLICATION OF BLACK LEVEL SIGNAL FOR SUPPRESSING LIGHT LEAKAGE

BACKGROUND OF THE INVENTION

1. Field of the Invention

This invention relates to a liquid crystal display apparatus and a method of driving the same. More particularly, this invention relates to a liquid crystal display apparatus provided with a display panel having two-dimensionally arranged pixels, and a method of driving such a display apparatus.

2. Description of the Prior Art

Generally, a conventional active matrix type liquid crystal display (LCD) apparatus has a number of pixels which are arranged in a matrix. FIG. 5 shows the sectional structure of a pixel 20 in a display panel of such an LCD apparatus. In the LCD apparatus shown in FIG. 5, two glass plates 11 and 12 are opposed to each other. On one surface of the glass plate 11, pixel electrodes 13 and signal lines 4 made of indium tin oxide (ITO) are formed, and, on the opposing surface of the other glass plate 12, a common electrode 15 made of ITO is formed. A black matrix 16 is formed on the common electrode 15. Usually, the black matrix 16 is made of a metal such as Cr. Between the two glass plates 11 and 12, a liquid crystal material 17 such as TN (Twisted Nematic) type liquid crystal is filled. Polarizing plates 18 and 19 are disposed on the outer surface of the glass plates 11 and 12, respectively. The liquid crystal disposed between the pixel electrode 13 and common electrode 15 can be simply considered as a light valve switch which is transparent when an adequate voltage is applied and opaque when no voltage is applied. When the LCD apparatus is of the normally black type, a voltage of the same level as that of the common electrode 15 is applied to the pixel electrode 13 of a pixel which is to be displayed as black, through the corresponding signal line 4, thereby making the liquid crystal 17 above the pixel electrode 13 opaque.

In such an active matrix type LCD apparatus of the prior art, when a white level area (area A of FIG. 4) is displayed so that as shown in FIG. 4 it is surrounded by black level areas (areas B–E of FIG. 4), the black level areas B and D which are above and below the white area A in FIG. 4 are not as sufficiently black as the other black level areas C and E. Namely, the gray scale of the black areas B and D has an intermediate value, while signals applied to the pixel electrodes 13 in the areas B and D have a level corresponding to black. This is caused by leakage light or smear (spurious) light due to crosstalk.

This will be described in more detail. When a signal voltage is applied to the pixel electrodes 13 in the area A via the corresponding signal lines 4 which extend in the areas B, A and D, the liquid crystal in the portion E (FIG. 5) which is disposed between the signal lines 4 and the common electrodes 15 also functions as a light valve switch, and becomes transparent. Therefore, light leaks through the liquid crystal in the portion E, resulting in that the gray scale of the areas B and D which should be displayed as black (i.e., the pixel electrodes 13 therein are not energized) becomes to have an intermediate value as a whole.

SUMMARY OF THE INVENTION

The LCD apparatus of this invention, which overcomes the above-discussed and numerous other disadvantages and deficiencies of the prior art, comprises pixels arranged in a matrix form; signal lines each for transferring image signals to each column of said pixels; and image signal means for supplying image signals to said signal lines, and further comprises: potential means for supplying a predetermined potential; a first connecting means for connecting said signal lines to said potential means during a first period of time, and for disconnecting said signal lines from said potential means for a second period of time; and a second connecting means for connecting said signal lines to said image signal means within said second period of time.

According to another aspect of this invention, a driving circuit for driving an LCD panel which comprises pixels arranged in a matrix form, a signal lines each for transferring image signals to each column of said pixels is provided. The driving circuit comprises: potential means for supplying a predetermined potential; a first connecting means for connecting said signal lines to said potential means during a first period of time, and for disconnecting said signal lines from said potential means for a second period of time; and a second connecting means for connecting said signal lines to said image signal means within said second period of time.

According to a further aspect of this invention, a method of driving an LCD apparatus which comprises: pixels arranged in a matrix form; signal lines each for transferring image signals to each column of said pixels; and image signal means for supplying image signals to said signal lines is provided. The method comprises the steps of: applying a predetermined potential to said signal lines during a first period of time; and transferring image signals to one row of said pixels through said signal lines within a second period of time.

In one preferred embodiment, said predetermined potential has a level by which the liquid crystal is driven to the black level.

Preferably, said predetermined potential pulsates.

Preferably, said apparatus further comprises storage means for holding said image signals, said storage means being connected between said image signal means and said second connecting means.

Preferably, each of said pixels comprises a storage capacitor for holding an image signal supplied from a corresponding one of said signal lines.

Preferably, said second period of time is the horizontal blanking period.

Thus, the invention described herein makes possible the objectives of:

(1) providing an LCD apparatus in which leakage of light does not occur;

(2) providing an LCD apparatus in which leakage of light through neighborhood of signal lines can be prevented;

(3) providing an LCD apparatus which is excellent in image quality;

(4) providing an LCD apparatus in which a black matrix is not required;

(5) providing a driving circuit for driving an LCD panel which can prevent leakage of light through the neighborhood of signal lines from occurring;

(6) providing a method of driving an LCD apparatus in which leakage of light does not occur; and (7) providing a method of driving an LCD apparatus which can drive the LCD apparatus without leakage of light through the neighborhood of signal lines.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
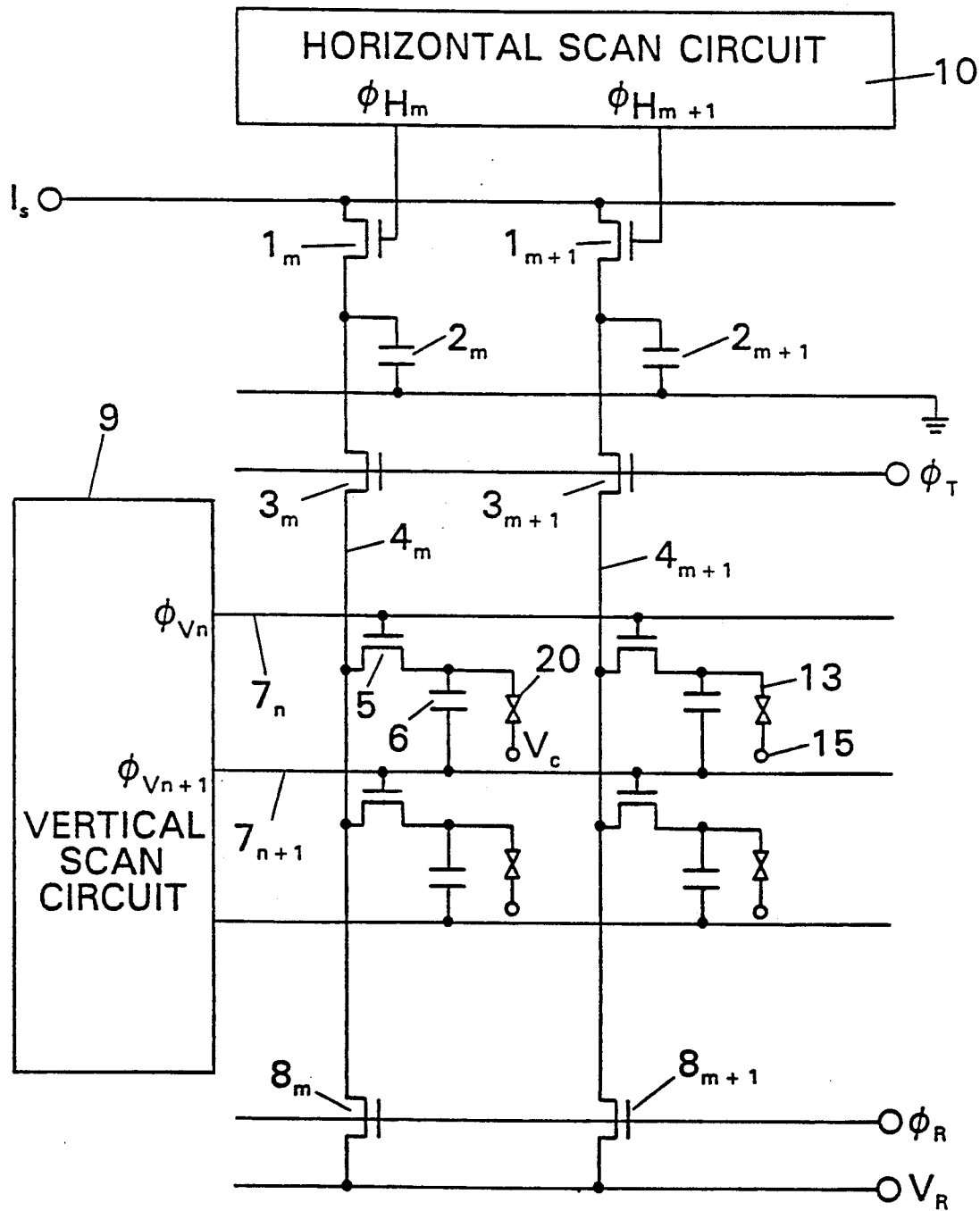
FIG. 1 is a circuit diagram illustrating an LCD apparatus according to the invention.
Figure 3:
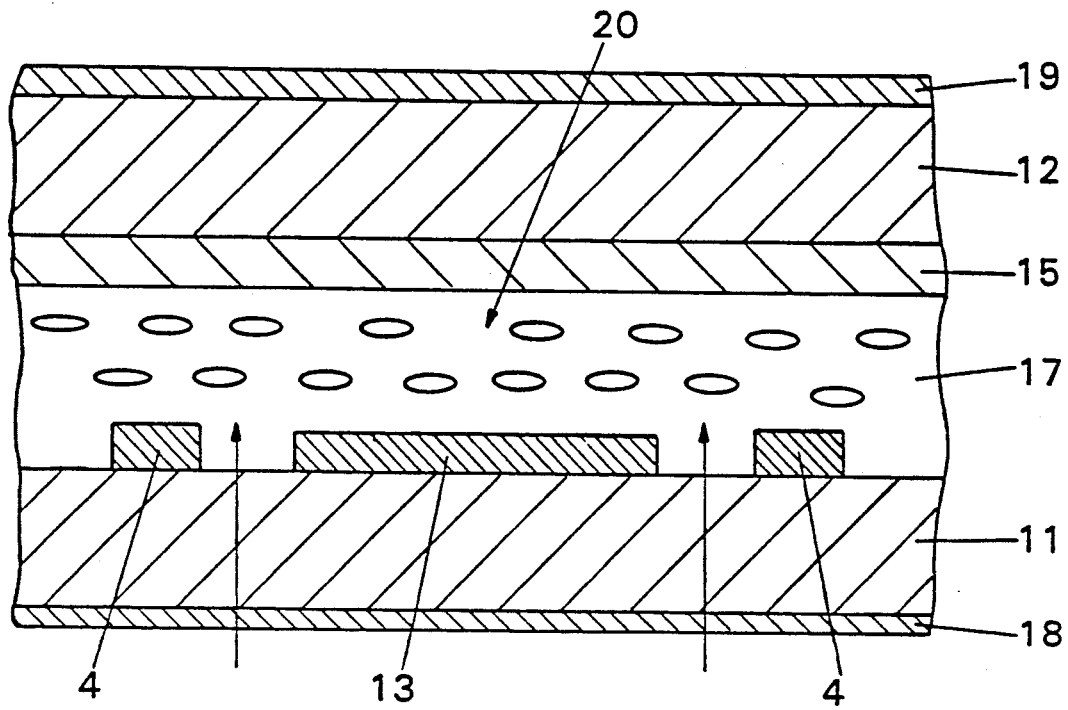
FIG. 3 shows a sectional structure of the LCD apparatus of FIG. 1.
Figure 5:
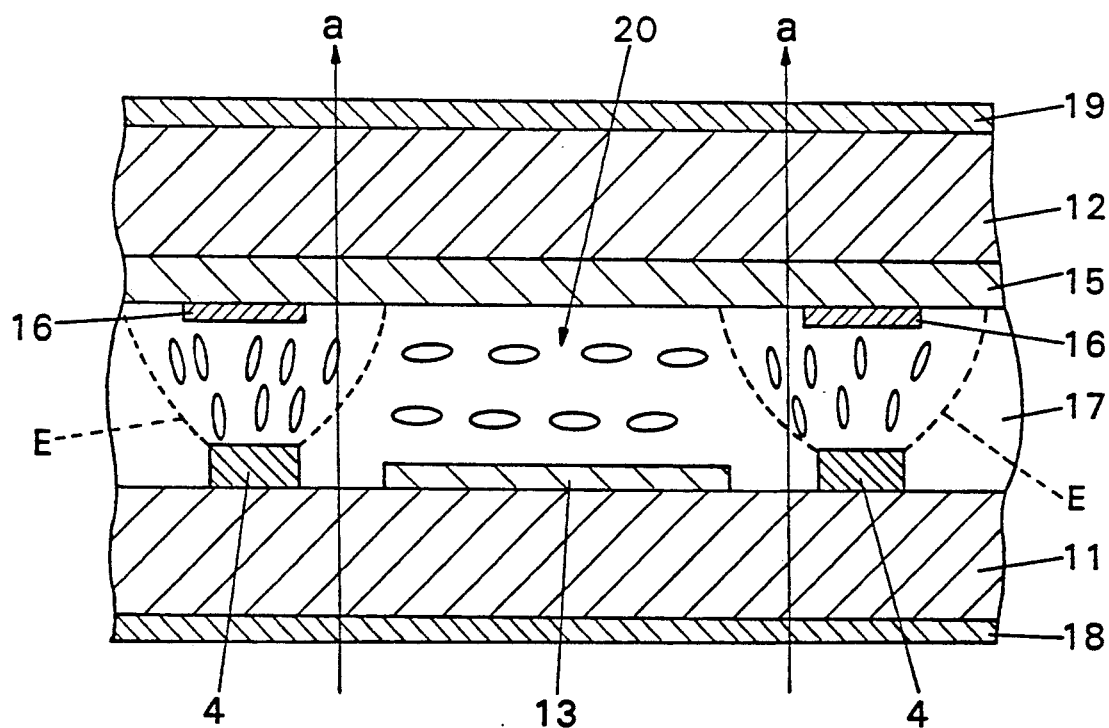
FIG. 5 shows a sectional structure of a conventional LCD apparatus.

FIG. 1 is a circuit diagram of an LCD apparatus according to the invention. The general structure of a pixel 20 of the display panel of this embodiment is shown in FIG. 3 wherein like numerals represent like components in FIG. 5. As seen from FIG. 3, the sectional structure of the display panel of this embodiment is constructed in substantially the same manner as that shown in FIG. 5, but the black matrix 16 is not formed. In this embodiment, the pixel 20 comprises a TFT 5 which functions as a switching element, and a storage capacitor 6. The pixel electrode 13 of each pixel 20 is connected to the drain of the TFT 5. The gates of the TFTs 5 for the pixels 20 of the nth row are connected to a gate signal line $7_n$, while the source of the TFTs 5 for the pixels 20 of the mth column are connected to a video signal line $4_m$. The gate signal line $7_n$ is connected to an output $\phi_{Vn}$ of a vertical scan circuit 9. The common electrode 15 is coupled to a voltage $V_c$ of a predetermined level. Between the pixel electrode 13 and the next gate signal line $7_{n+1}$ for the (n+1)th row, a storage capacitor 6 is formed.

One end of the video signal line $4_m$ is connected to a video input $I_s$ to which video signals are supplied, through a series connection of a transfer gate $3_m$ and an analog switch $1_m$. The gate of the analog switch $1_m$ is coupled to an output $\phi_{Hm}$ of a horizontal scan circuit 10. The gate terminal of the transfer gate $3_m$ is coupled to an input terminal $\phi_T$ to which a signal for activating the video signal line $4_m$. A capacitor $2_m$ is formed between the ground and the junction point of the switch $1_m$ and gate $3_m$. The other end of the video signal line $4_m$ is connected to a reset voltage terminal $V_R$ through a reset switch $8_m$. The level of the reset voltage applied to the terminal $V_R$ (hereinafter, such a reset voltage also is referenced by $V_R$) is selected so that, when the reset voltage $V_R$ is applied to the video signal line $4_m$, the liquid crystal disposed above the electrode $4_m$ is "opaque". When the LCD apparatus is driven by the normally black drive method, therefore, the voltage level $V_R$ equals the voltage level applied to the common electrode 15 (i.e., $V_R = V_C$). The gate of the reset switch $8_m$ is coupled to an input terminal $\phi_R$ to which a signal for activating the reset switch $8_m$. Although only two columns and two rows of pixels are shown in FIG. 1, actually, a number of pixels are arranged in a matrix form.

Figure 2:
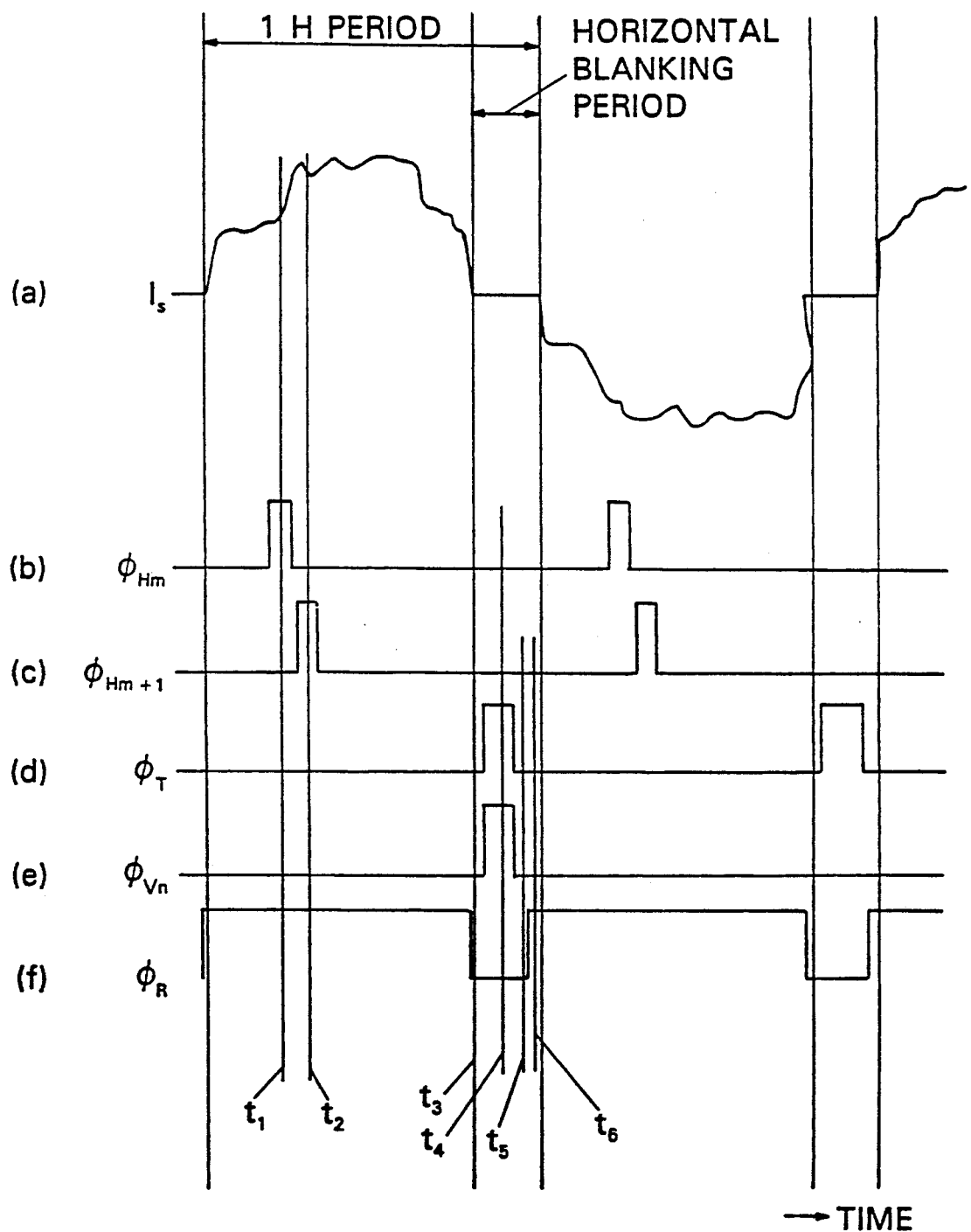
FIG. 2 is a timing chart illustrating the operation of the LCD apparatus of FIG. 1.

FIG. 2 shows waveforms appearing when the LCD apparatus of FIG. 1 is driven by the so-called "1H inverting drive method" in which the polarity of the video signal is inverted every horizontal scan period. In FIG. 2, $I_s$ ((a) of FIG. 2) is the waveform of the 1H inverted video signal input form the input terminal $I_s$, $\phi_{Hm}$ and $\phi_{HM+1}$ ((b) and (c) of FIG. 2) are the waveforms of the respective pulse signals produced by the horizontal scan circuit 10 to drive the analog switches $1_m$ and $1_{m+1}$, $\phi_T$ ((d) of FIG. 2) is the waveform of the pulse signal supplied to the terminal $\phi_T$, $\phi_{Vn}$ ((e) of FIG. 2) is the waveform of the pulse signal produced by the vertical scan circuit 9 to drive the TFTs 5 in the nth row, and $\phi_R$ ((f) of FIG. 2) is the waveform of the reset signal applied to the terminal $\phi_R$ to drive the reset switch $8_m$.

The operation of this LCD apparatus will be described with reference to FIG. 2.

First, at time $t_1$ during a horizontal scanning period, the pulse signal $\phi_{Hm}$ becomes high, and the analog switch $1_m$ for the mth column is closed. Since the signal $\phi_T$ supplied to the gate of the transfer gate $3_m$ is low at time $t_1$, the transfer gate $3_m$ remains closed. Consequently, the potential of the video signal $I_s$ appearing at time $t_1$ is held by the capacitor $2_m$. The reset pulse $\phi_R$ is high and the reset switch $8_m$ is closed, so that the potential of the signal line $4_m$, $4_{m+1}$, . . . is kept at the voltage level $V_R$ and the liquid crystal disposed above the electrode $4_m$, $4_{m+1}$, . . . is opaque. Next, at time $t_2$, the pulse signal $\phi_{Hm+1}$ becomes high so that the analog switch $1_{m+1}$ for the (m+1)th column is closed, and the potential of the video signal $I_s$ at time $t_2$ is held by the capacitor $2_{m+1}$. In this way, the potentials of the video signal $I_s$ at each time in the horizontal scanning period respectively are held in sequence in the capacitors $2_m$, $2_{m+1}$, . . . by the pulses $\phi_{Hm}$, $\phi_{Hm+1}$, . . . sequentially output from the horizontal scan circuit 10.

At the commencement of the horizontal blanking period (time $t_3$), the reset pulse $\phi_R$ becomes low, and the reset switch $8_m$ is turned off so that the voltage level $V_R$ becomes not to be applied to the signal line $r_m$, $4_{m+1}$, . . . .

During the horizontal blanking period in the horizontal scanning period (time $t_4$), the pulse signal $\phi_T$ applied to the gate of the transfer gates $3_m$, $3_{m+1}$, . . . becomes high, and the transfer gates $3_m$, $3_{m+1}$, . . . are closed. The potential of each of the signal lines $4_m$, $4_{m+1}$, . . . becomes the potential of the video signal held in the corresponding one of the capacitors $2_m$, $2_{m+1}$, . . . , in accordance with the capacitance distribution. In order to adequately accomplish this capacitance distribution, it is preferable that the capacitance of the capacitors $2_m$, $2_{m+1}$, . . . is set at a value sufficiently larger than the stray capacitance of the corresponding signal lines $4_m$, $4_{m+1}$, . . . . According to our experiments, preferably results were obtained by setting the capacitance of the capacitors $2_m$, $2_{m+1}$, . . . to 3 to 10 pF when the capacitance of the signal lines $4_m$, $4_{m+1}$, . . . was about 1 pF.

At the same time (time $t_4$), the pulse signal $\phi_{Vn}$ corresponding the nth row and output from the vertical scan circuit 9 via the gate signal line $7_n$ becomes high. The TFTs 5 of the nth row are turned on so that the potentials of the video signals respectively stored in the capacitors $2_m$, $2_{m+1}$, . . . are transferred to the storage capacitors 6 of the respective pixels of the nth row, in accordance with the capacitance distribution.

At time $t_5$ within the horizontal blanking period, both the pulse signals $\phi_T$ and $\phi_{Vn}$ return to low level. The transfer gates $3_m$, $3_{m+1}$, ... are opened to disconnect the capacitors $2_m$, $2_{m+1}$, ... from the signal lines $4_m 4_{m+1}$, ..., and the TFTs 5 of the nth row are turned off. Therefore, the potentials of the video signals respectively stored in the storage capacitors 6 are held until the next write (one field or one frame later) so that the pixels of the nth row are driven to perform the display operation according to the video signals during one field.

Immediately before the commencement of the next horizontal scanning period (time $t_6$), the reset pulse $\phi_R$ returns to high level, thereby keeping again the potential of the signal lines $4_m$, $4_{m+1}$, ... at the level $V_R$ by which the liquid crystal disposed above the electrodes $4_m$, $4_{m+1}$, ... is made opaque. During the next horizontal scanning period, video signals are transferred to the storage capacitors 6 of the pixels of the (n+1)th row in the same manner as described above.

Figure 4:
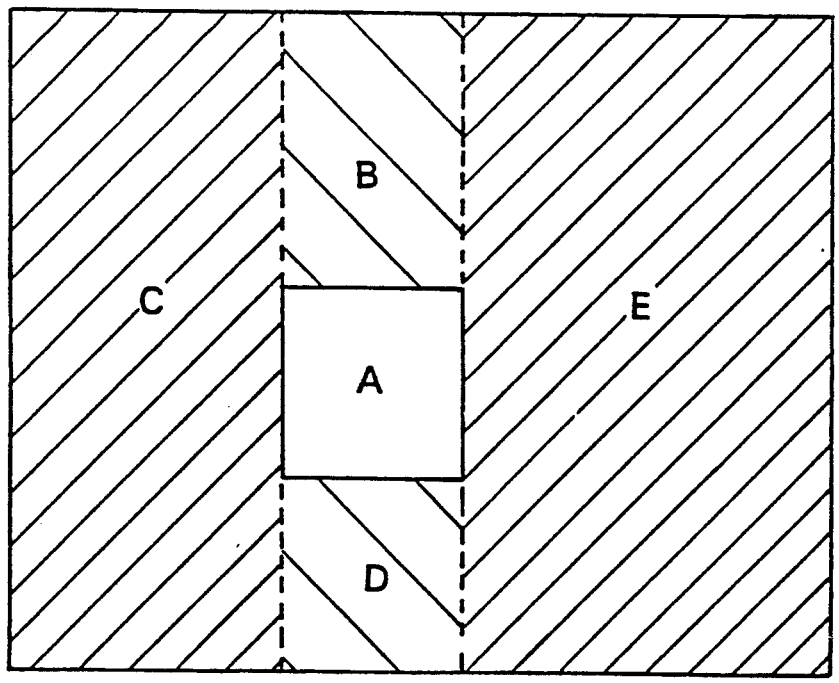
FIG. 4 is a diagram illustrating a display in a conventional LCD apparatus.

According to this embodiment, therefore, even when a white level area is sandwiched or surrounded by a black level area(s) as shown in FIG. 4, the level of all the signal lines $4_m$, $4_{m+1}$, ... is forcedly set during the majority portion (i.e., the period when the pulse signal $\phi_T$ is not active) of one horizontal scanning period to the value at which the liquid crystal 17 is opaque. In other words, the degree of leakage light a (FIG. 5) caused by the transparent state of liquid crystal above the signal lines $4_m$, $4_{m+1}$, ... is decreased to about 1/10–1/100 as compared with that in a conventional apparatus (the value corresponds to the duty ratio of the inversion of the reset pulse $\phi_R$). It can be said that according to this invention leakage of light can be substantially prevented from occurring.

Figure 6:
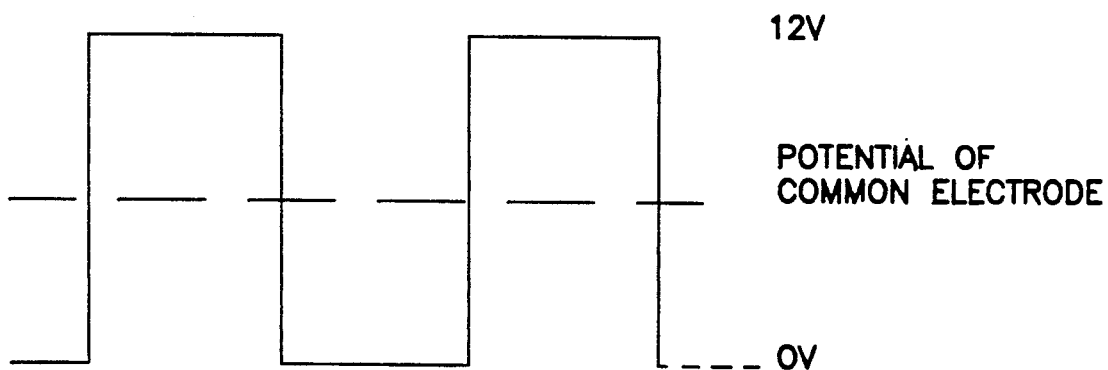
FIG. 6 shows waveforms of the reset voltage in pulse form.

When the LCD apparatus is driven in the normally white drive method, pulses the level of which alternatingly varies around the potential of the common electrode 15 by, for example, 0 V to 12 V (peak-peak), as shown in FIG. 6, are applied to the reset voltage terminal $V_R$. By this means, portions corresponding to the signal lines $4_m$, $4_{m+1}$, ... can be made sufficiently white, and unevenness in the display at the borderline with displayed pixels as eliminated.

According to this invention, leakage light can be suppressed to the extent that the black matrix 16 (FIG. 5), which is employed in a conventional LCD apparatus to suppress leakage light, is no longer necessary.

In the above, embodiments in which the 1H inverting drive method is used are described. The same effect can be achieved in an LCD apparatus according to the invention which is driven by another drive method such as the 1 V inverting drive method or 1-pixel inverting drive method. In this case, it is preferable that the reset voltage $V_R$ is a pulse signal. The frequency, pulse width, etc. of such a pulse signal may be adequately selected in accordance with the adopted drive method.

As described above, according to this invention, leakage light caused by the potential of the signal lines can be suppressed, and therefore it is extremely effective in improving the display quality of an LCD display apparatus.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. In a liquid crystal display apparatus comprising: pixels arranged in rows and columns; signal lines each for transferring image signals to each column of said pixels; and image signal means for supplying image signals to said signal lines;

said apparatus further comprises:

potential means for supplying a predetermined potential, said predetermined potential having a level by which the liquid crystal is driven to a black level;

a first connecting means for simultaneously connecting all of said signal lines to said potential means during a first period of each horizontal scanning period, and for simultaneously disconnecting all of said signal lines form said potential means for a second period of said horizontal scanning period, said second period being a horizontal blanking period; and a second connecting means for simultaneously connecting all of said signal lines to said image signal means within said second period wherein said second period coincides with a selection period of one row of said pixels.

2. A liquid crystal display apparatus according to claim 1, wherein said apparatus further comprises storage means for holding said image signals, said storage means being connected between said image signal mans and said second connecting means.

3. A liquid crystal display apparatus according to claim 1, wherein each of said pixels comprises a storage capacitor for holding an image signal supplied from a corresponding one of said signal lines.

4. In a driving circuit for driving a liquid crystal panel, said panel comprising: pixels arranged in rows and columns; and signal lines each for transferring image signals to each column of said pixels, said driving circuit comprises:

image signal means for supplying image signals to said signal lines;

potential means for supplying a predetermined potential, said predetermined potential having a level by which the liquid crystal is driven in a black level;

a first connecting means for simultaneously connecting all of said signal lines to said potential means during a first period of each horizontal scanning period, and for simultaneously disconnecting all of said signal lines from said potential means for a second period of said horizontal scanning period, said second period being a horizontal blanking period; and a second connecting means for simultaneously connecting all of said signal lines to said image signal means within said second period wherein said second period coincides with a selection period of one row of said pixels.

5. A liquid crystal display apparatus according to claim 4, wherein said apparatus further comprises storage means for holding said image signals, said storage means being connected between said image signal means and said second connecting means.

* * * * *